United States Patent [19]

Musha et al.

[11] 4,453,239
[45] Jun. 5, 1984

[54] METHOD AND APPARATUS FOR CONTROLLING THE FOCUSING AND TRACKING OF A LIGHT BEAM USING A MAIN AND SECONDARY LIGHT BEAM IN ASSOCIATION WITH MULTIPLE DETECTORS

[75] Inventors: Tohru Musha; Kiichi Kato; Kenichi Ito, all of Hachioji, Japan

[73] Assignee: Olympus Optical Company, Ltd., Tokyo, Japan

[21] Appl. No.: 293,082

[22] Filed: Aug. 14, 1981

[30] Foreign Application Priority Data

Aug. 19, 1980 [JP] Japan .................. 55-114470

[51] Int. Cl.³ .................................... G11B 7/12
[52] U.S. Cl. ........................ 369/45; 369/44; 369/46; 369/112; 250/201; 250/204
[58] Field of Search ........................ 346/76 L, 108; 369/43–46, 106, 112, 116; 350/247, 255; 250/201, 202, 204, 555

[56] References Cited

U.S. PATENT DOCUMENTS

| | | | |
|---|---|---|---|
| 3,925,603 | 12/1975 | Naruse et al. | 369/45 |
| 3,974,327 | 8/1976 | Van Dijk | 369/45 |
| 4,275,275 | 6/1981 | Bricot et al. | 369/44 |
| 4,358,200 | 11/1982 | Heemskerk et al. | 369/45 |

*Primary Examiner*—Raymond F. Cardillo, Jr.
*Attorney, Agent, or Firm*—Parkhurst & Oliff

[57] ABSTRACT

An apparatus and method for recording optically an information signal on a disk-like record medium as a spiral track or concentrical tracks by modulating a main beam by the information signal to be recorded and projecting the modulated main beam onto the record medium. In order to obtain a tracking error signal, a sub beam is also projected on the record medium at an edge of an adjacent track which has been previously recorded and the sub beam reflected by the record medium is detected by a light detector to produce the tracking error signal which is then supplied to a high pass filter to remove a low frequency component from the tracking error signal.

10 Claims, 10 Drawing Figures

METHOD AND APPARATUS FOR CONTROLLING THE FOCUSING AND TRACKING OF A LIGHT BEAM USING A MAIN AND SECONDARY LIGHT BEAM IN ASSOCIATION WITH MULTIPLE DETECTORS

BACKGROUND OF THE INVENTION

The present invention relates to a method for recording optically information by projecting a light beam modulated in accordance with the information to be recorded on a light sensitive record medium as a single spiral track or a number of concentrical tracks by means of an objective lens and to an apparatus for carrying out such an optical information recording method.

In such optical information recording method and apparatus, the light beam modulated in accordance with the information should be made incident upon the record medium along the precisely predetermined spiral track or concentric tracks. For the sake of simplicity these tracks are termed as circular tracks hereinafter. To this end, a so-called tracking control should be effected in accordance with a tracking error signal which represents an amount and a direction of deviation of the light beam with respect to the predetermined circular track; i.e. a tracking error. There have been proposed various methods for deriving the tracking error signal. In one method, the tracking error signal is obtained by projecting two light beams onto a record medium by means of an objective lens;

modulating one of said two light beams (main beam) in accordance with an information signal;

focussing the other light beam (sub beam) onto an edge of an adjacent track which has been recorded by said main beam or onto an edge of a tracking track which has been previously formed for tracking; and detecting a change in an amount of said sub beam reflected by the record medium by means of a light detector.

In the known apparatus for recording optically information mentioned above, the record medium is usually called as a video disc in which encoded video and audio signals are recorded as optical information such as optical transmitting, reflection and phase properties. One of important properties of such a record medium is a very high density of recorded information and thus, a width of the information track is very narrow and a space between successive tracks is also very narrow. In order to record the information in the video disc in the form of circular information tracks having very narrow width and pitch correctly, it is necessary not only to minimize a radius of a light spot on the disc plane all the time by driving the objective lens always in an infocussed condition with respect to the plane of the video disc, but also to make a distance between successively recorded tracks constant exact.

In the usual information recording apparatus mentioned above, there might occur a problem that a direct current or very low frequency component of the tracking error signal is varied due to a variation of a light intensity of a light source, an irregularity of reflection factor of the disc and so on, and thus the recorded information tracks have a discrepancy from the correct spiral or concentrical tracks due to the variation of the direct current or low frequency component in the tracking error signal.

SUMMARY OF THE INVENTION

The present invention has for its object to provide a method for recording optically an information in a record medium as information tracks having a correct spiral or concentrical configuration.

To this end, according to the invention, in a method for recording optically an information signal on a record medium as circular tracks by projecting main and sub light beams onto the record medium by means of an objective lens; modulating the main light beam in accordance with the information to be recorded; focussing the sub light beam onto an edge of a track which has been previously recorded in the record medium; detecting by a light detector a change in an amount of said sub light beam reflected by said record medium to produce a tracking error signal; and moving said main and sub light beams in a direction perpendicular to the track in accordance with the tracking error signal; the improvement comprises a step of removing a low frequency component including a direct current component from the tracking error signal supplied from said light detector.

It is another object of the invention to provide a novel and useful apparatus for recording an information signal on a record medium, which apparatus can record the information signal along predetermined circular tracks in an accurate manner without being influenced by a variation in light intensity of a light source, a variation in reflection factor of the record medium and the like.

According to the invention, an apparatus for recording optically a information signal on an record medium as circular tracks comprises a light source for emitting main and sub light beams, the main light beam being modulated in accordance with the information signal to be recorded but the sub light beam being unmodulated; an objective lens for projecting the modulated main light beam onto the record medium and the unmodulated sub light beam onto the record medium at edges of tracks which have been previously recorded; a light detector for receiving the sub light beam reflected by the record medium to produce a tracking error signal; a high pass filter for removing from the tracking error signal a low frequency component including a direct current component; a driving circuit for receiving the tracking error signal having the low frequency component removed therefrom to produce a tracking control signal; and a driving device for moving the main and sub light beams relative to the record medium in a direction perpendicular to the tracks in accordance with the tracking control signal supplied from said driving circuit.

DESCRIPTION OF THE PREFERRED EMBODIMENTS

Figure 1:
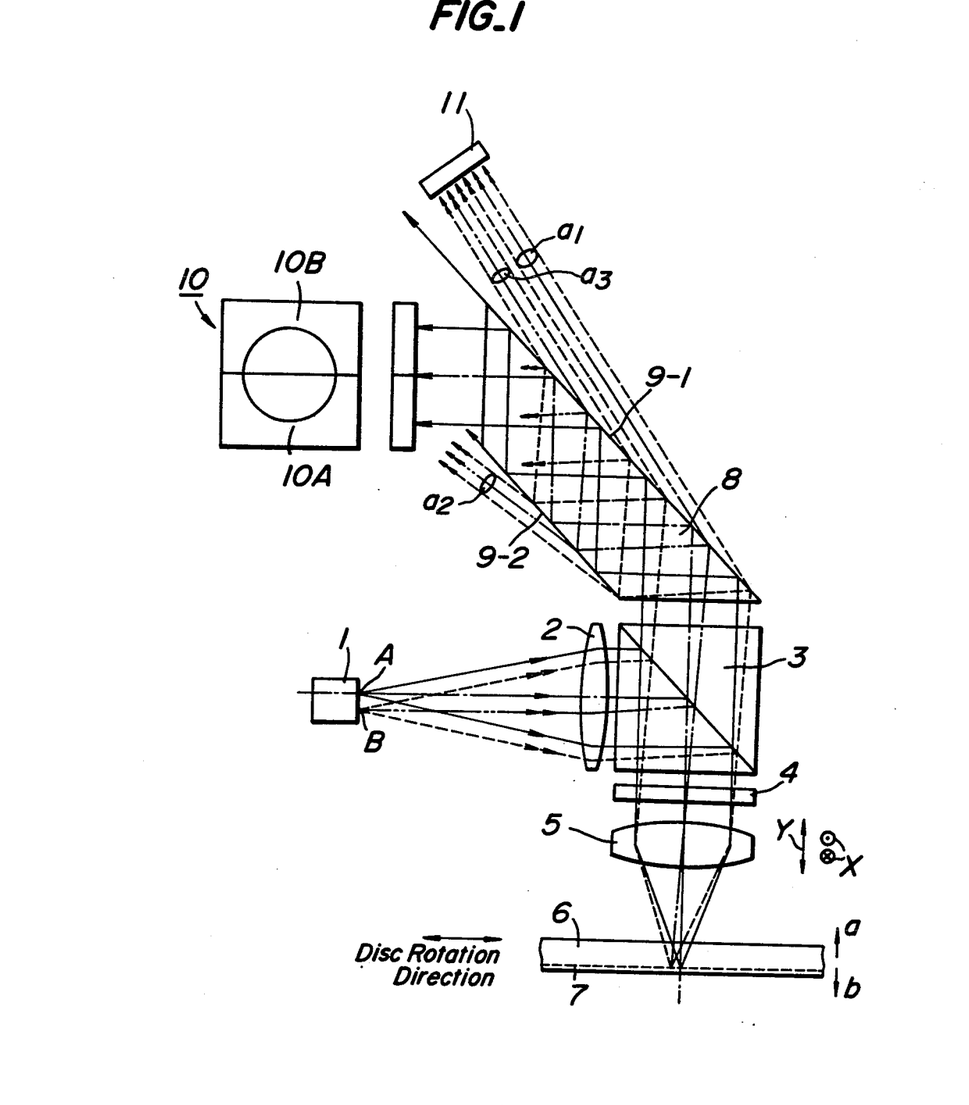
FIG. 1 is a schematic view illustrating one embodiment of an optical information recording apparatus according to the invention.

FIG. 1 is a schematic view illustrating one embodiment of an optical information recording apparatus according to the invention. In FIG. 1, a laser light source 1 has two light emitting points A and B. In this embodiment, a beam emitted from the light emitting point A is used as a main beam (illustrated by a solid line) for recording an information and a beam from the light emitting point B is used as a sub beam (illustrated by a dot line) for detecting a tracking error.

In order to obtain the main and the sub beams, instead of the laser light source having two light emitting points, use may be made of a light source emitting a single light beam. In such a case the main beam and the sub beam which are specially spaced from each other and are inclined relative to each other by a small angle may be obtained from the single beam, for example, by means of a polarizing property of crystal, a grating or a prism for separating one beam into a reflection beam and a transmitted beam.

Two beams emitted from the laser light source 1 are converted by a collimator lens 2 into parallel light fluxes with optical axes, which are inclined relative to each other. This is due to the fact that a center light beam of the main beam (illustrated by a one-dotted chain line) impinges upon a center of the collimator lens 2, whereas a center light beam of the sub beam (illustrated by a two-dotted chain line) impinges upon the collimator lens 2 with a discrepancy from the center thereof. If a focal length f of the collimator lens 2 is 9 mm and a distance between the light emitting points A and B is 125 μm, an inclination of light axes of both beams becomes about 48' (minutes).

Since the main and sub light beams emitted from the laser light source 1 and collimated into the parallel light beams by the collimator lens 2 are S-polarized, both light fluxes are reflected completely by a reflection plane of the polarizing prism 3 and then impinge upon a quarter-wavelength plate 4. Both light fluxes emitted from this plate (converted into circularly polarized light fluxes) impinge upon an objective lens 5.

In this embodiment, the main beam and the sub beam are overlapped each other at the objective lens 5, because the objective lens 5 is arranged at a focal position of the collimator lens 2, but if a radius of both beams is slightly larger or smaller than an aperture of the objective lens, the objective lens can be arranged at such a position that both beams are not overlapped completely, that is, at a position which is a part from the focal point of the collimator lens 2.

The respective beams emitted from the objective lens 5 are focussed onto a recording surface 7 in a disc 6. That is to say, the main beam is made in parallel to an optical axis of the objective lens 5 so that a spot is formed on the optical axis. Since the sub beam is inclined to the optical axis of the objective lens 5, a spot is formed at a position deviated from the optical axis. For instance, in the above mentioned embodiment in which both the beams are inclined relative to each other by about 48', if the focal length of the objective lens is 4.3 mm, a distance between both spots on the recording surface 7 becomes about 60 μm.

The both light fluxes are reflected by the recording surface 7, pass through the objective lens 5 and impinge onto the quarter-wavelength plate 4. Since the light fluxes are transmitted through the quarter-wavelength plate 4 twice, their polarizing direction is converted by 90° in comparison with the incident light fluxes and thus, they are converted into P-polarized light fluxes. Then these light fluxes pass through the polarizing prism 3 completely and impinge onto a detection prism 8.

Reflection surfaces 9-1 and 9-2 of the detection prism 8 are so arranged that an angle of incidence of an optical axis of the main beam is equal to a critical angle or a slightly smaller than the critical angle. In the in-focussed condition, the main beam which passes through the objective lens 5 and the polarizing prism 3, impinges upon the reflection surfaces 9-1 and 9-2 as the parallel light flux. Therefore the almost whole light flux of the main beam is totally reflected by the reflection surfaces 9-1 and 9-2 by three times and is made incident upon a first light detector 10. If the disc 6 deviates out of the in-focussed condition in a direction a or b, as will be described in detail with reference to FIGS. 2 and 3, the main beam impinging upon the deflection surfaces 9-1 and 9-2 becomes a light flux with an inclined component, and a right hand half light flux with respect to the central light ray of the main beam impinging upon the prism 8 or a left hand half light flux with respect to the central light ray is totally reflected, and impinges onto the light detector 10. The light detector 10 comprises two light detecting fields 10A and 10B and a focussing error signal can be derived by detecting a variation in a distribution of an amount of light fluxes of the main beam impinging upon the light detecting fields 10A and 10B after being reflected by the reflection surfaces 9-1 and 9-2. The distribution of the light fluxes is varied according to whether the in-focussed condition is achieved or not as mentioned below.

Figure 2:
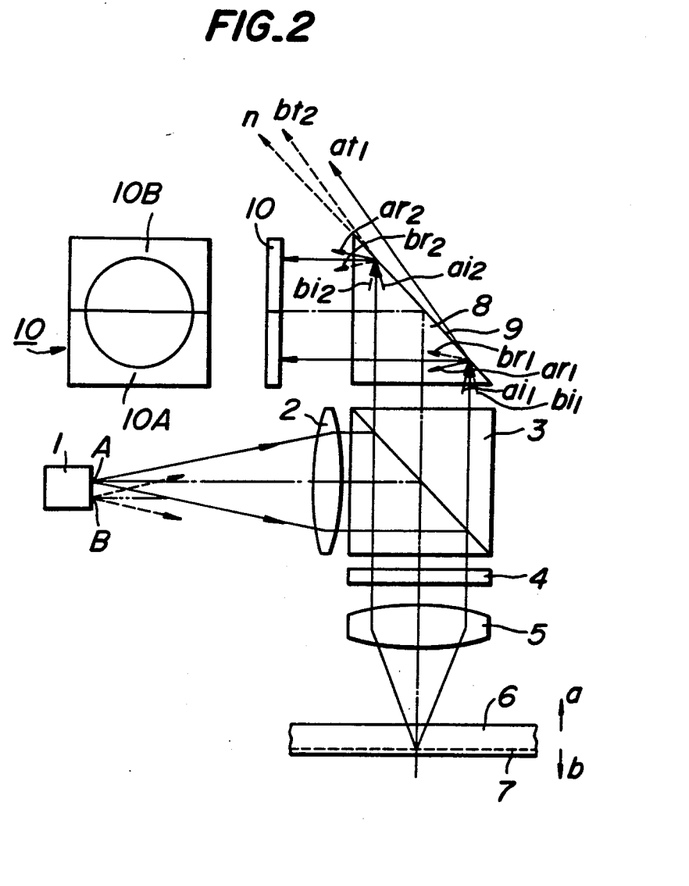
FIGS. 2 and 3 are diagrams explaining a focus detecting principle of the apparatus shown in FIG. 1.
Figure 3:
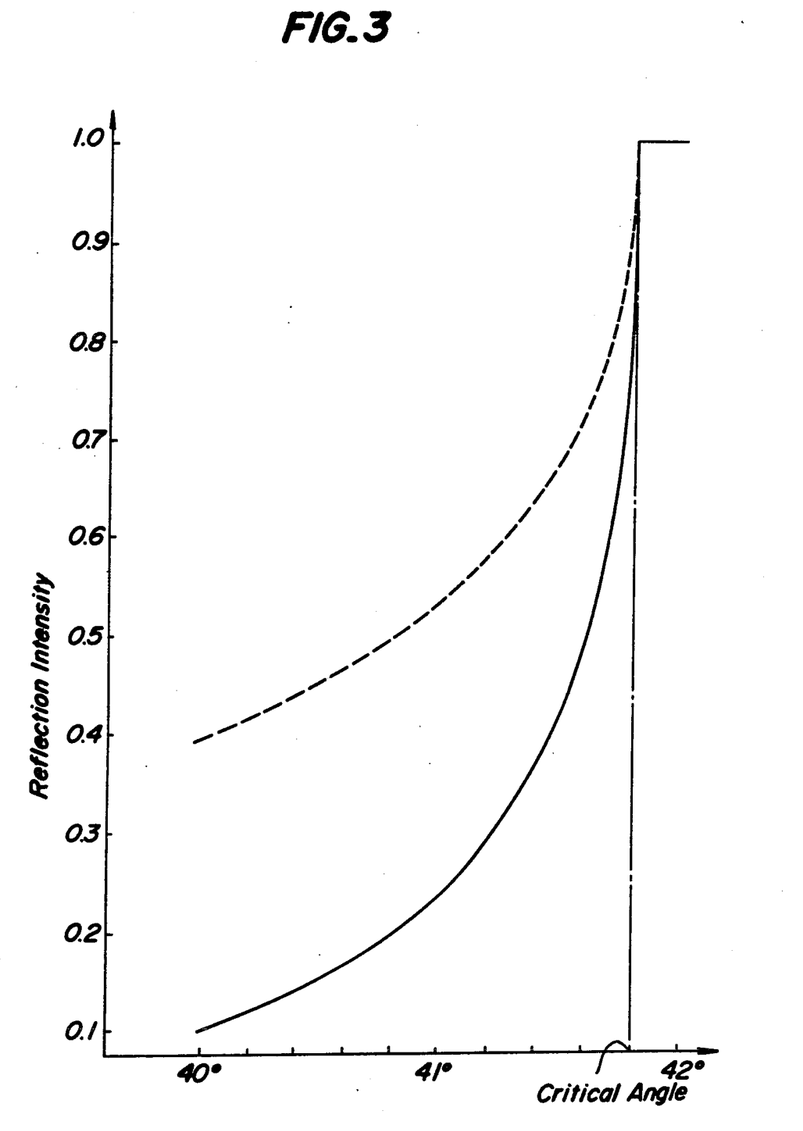

FIG. 2 is a diagram explaining a focus detecting principle of the method according to the invention. In FIG. 2, for simplicity, it is assumed that a light is reflected by the reflection prism only once and elements corresponding to those shown in FIG. 1 are denoted by the same reference numerals as those used in FIG. 1. As described in FIG. 2, the reflection surface 9 is so arranged that the central light ray of the main beam is made incident upon the surface 9 almost at a critical angle in the in-focussed condition. Therefore, in the in-focussed condition, the whole light flux of the main beam transmitted through the polarizing prism 3 is totally reflected by the reflection surface 9 (in practice, a small amount of light is transmitted into a direction n shown in FIG. 2 due to incompleteness of a surface condition of the reflection surface). If the disc 6 deviates from the in-focussed condition in a direction a, the light flux transmitted through the polarizing prism 3 changes into a diverging light flux including extreme light rays $ai_1$–$ai_2$ with respect to the reflection surface 9. On the contrary, if the disc 6 deviates out of the in-focussed condition in a direction b, an incident light to the reflection surface 9 changes into a converting light flux including extreme light rays $bi_1$–$bi_2$. That is to say, if the disc 6 deviates from the in-focussed condition, the incident angles of the light rays impinging upon the reflection surface 9 vary in a continuous manner about the critical angle except for the central light ray passing along the optical axis. Therefore, when the disc 6 deviates from the in-focussed condition either in the direction a or b, the intensity of the light reflected by the reflection surface 9 varies abruptly near the critical angle in accordance with the above mentioned variation in the incident angles. In this case, a positional relation of bright and dark areas on the detector 10 varies in mutually opposite manner with respect to a boundary plane being perpendicular to a plane of the drawing and including a central light ray. On the contrary, in the in-focussed condition, since the incident light flux impinging upon the reflection surface 9 is totally reflected in a uniform manner, the bright and dark pattern does not appear. The light detector 10 detects the distribution of intensity of light flux reflected by the reflection surface 9. To this end the light detector 10 is so constructed that the light fluxes are separately received by two receiving regions 10A, 10B which are divided along a plane which includes the central light ray (optical axis) and is perpendicular to the plane of the drawing. In FIG. 2, a front view of the light detector 10 is also shown. FIG. 3 is a diagram showing the reflected light intensities $R_p$ and $R_s$ of P- and S-polarized light rays, respectively. A refractive index of the detection prism 10 is 1.50. In this embodiment, a detection sensitivity for the P-polarized light ray is higher than that for the S-polarized light ray. It should be noted that an intensity of a non-polarized light ray is equal to an intermediate value of $R_p+R_s/2$.

In FIG. 2, if the disc 6 deviates in the direction a, all light rays up to the extreme light ray $ai_1$ in the right hand half of the incident light flux are made incident upon the reflection surface 9 at incident angles smaller than the critical angle. Therefore, these light rays are transmitted through the reflection surface 9 and the light flux including the outermost light ray $at_1$ and $at_n$ is transmitted. Due to this transmitting the intensities of the reflected light rays from the outermost light ray $ar_1$ to the central light ray are weakened. Contrary to this all the light rays up to the outermost light ray $ai_2$ in the left hand half of the incident light flux impinge upon the reflection surface 9 at incident angles larger than the critical angle. Therefore, in this part these light rays are not transmitted through the reflection surface 9, but are totally reflected thereby. In this manner all the incident light rays from the outermost light ray $ar_2$ to the central light ray are totally reflected by the surface 9. Therefore, in this case, the receiving regions 10A and 10B are dark and light, respectively.

On the contrary, if the disc 6 deviates in the direction b, the relation between the inclinations of the incident light rays impinging onto the reflection surface 9 is inverted as compared with that just explained above, so that the receiving region 10A is irradiated brightly, but the other region 10B is not irradiated. In FIG. 2, the reflection light and the transmitted light on the reflection surface 9 are shown by $br_1$, $br_2$ and $bt_2$, respectively.

In the in-focussed condition, the amounts of light impinging upon the respective receiving regions 10A, 10B become the same.

Therefore, by detecting a difference in output signals from the light receiving regions 10A and 10B, it is possible to obtain the focussing error signal having an amplitude which is proportional to an amount of the deviation from the in-focussed condition and a polarity which represents a direction of the deviation with respect to the in-focussed condition. The focussing error signal thus obtained is used to effect a focussing control for driving the objective lens 5 in the direction of its optical axis as illustrated by an arrow Y in FIG. 1. Further, in the in-focussed condition, since the light is scarcely transmitted through the reflection surface 9, a loss of light is very small and in the defocussed condition the half of light flux with respect to the central light ray is totally reflected, but an amount of the other half of light flux reflected by the surface 9 is decreased to a great extent, the difference in the amount of light impinging upon the regions 10A and 10B becomes great. Therefore, the very accurate focus detection can be effected with a very high sensitivity.

In case of recording an information signal on the record medium such as a video disc, it is necessary for a light spot not only to be always focussed on the information record surface by means of the above mentioned focussing control, but also to be always situated on a given spiral or concentrical track without a tracking error under the control of a tracking control. This tracking control can be made by using the sub beam. This sub beam for tracking is, as mentioned above, reflected by the recording surface 7 and then impinges upon the detection prism 8 through the objective lens 5, the quarter-wavelength plate 4, and the polarizing prism 3, but since this sub beam is inclined to the main beam for recording and the incident angle of the light flux impinging upon the deflection surfaces 9-1 and 9-2 is smaller than a critical angle, the sub beam is almost transmitted through the surfaces and thus, the amount of light impinging upon the light detector 10 which receives the main beam may be almost ignored. For instance, as mentioned above, in case that the sub beam in inclined by an angle of 48' to the main beam impinging perpendicularly to the detection prism 8 made of material having a refractive index of 1.5, an inclined angle between the main and sub beams impinging upon the reflection surface 9-1, 9-2 becomes about 32'. In this case, as a transmittivity per one reflection is about 69% for the P-polarized light as clearly shown in FIG. 3, the total amounts of the transmitted lights become about 96% after three reflections. That is to say, only 4% of the sub beam is made incident upon the light detector 10 for the main beam and cross talk can be neglected. It should be noted that in FIGS. 1 and 2 the refractive index of the detection prism 8 is $n=\sqrt{2}$, that is, the critical angle is about 45° for the sake of simplicity.

When it is required to further decrease the influence of the sub beam upon the main beam detected by the light detector 10, the intensity of the sub beam may be weakened.

In this embodiment, a transmitted light flux $a_1$ of the sub beam produced at the first reflection and a transmitted light flux $a_3$ produced upon the third reflection are detected by the light detector 11. But, it is possible that the transmitted light flux $a_2$ of the sub beam produced at the second reflection may be detected or that all the three transmitted light fluxes may be detected by arranging another two light detectors for the sub beam.

In this embodiment, it is possible to separate the main and sub beams spatially by detecting the slight angle deviation between the main and sub beams by means of the detection prism arranged substantially at the critical angle. On the contrary, said two beams may be spatially separated at a focus plane of a lens having a sufficiently long focal distance in comparison with that of the objective lens, but in this case, a construction of the whole optical system might be unfavourably large.

Figure 4:
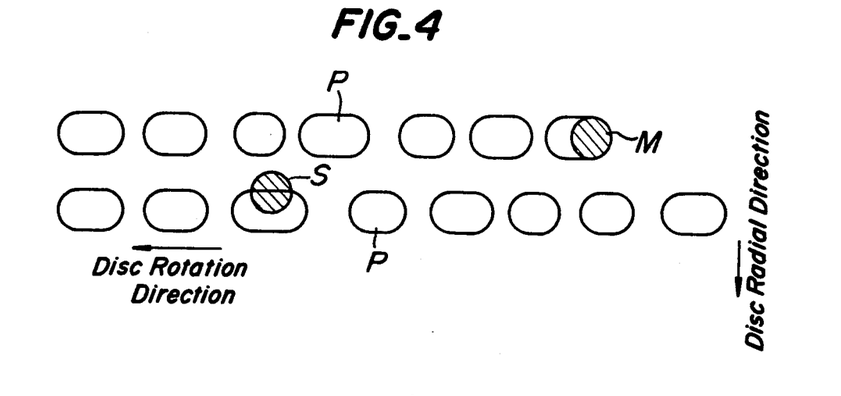
FIGS. 4 and 5 are diagrams for explaining a method for effecting a tracking control in the apparatus shown in FIG. 1.
Figure 5:
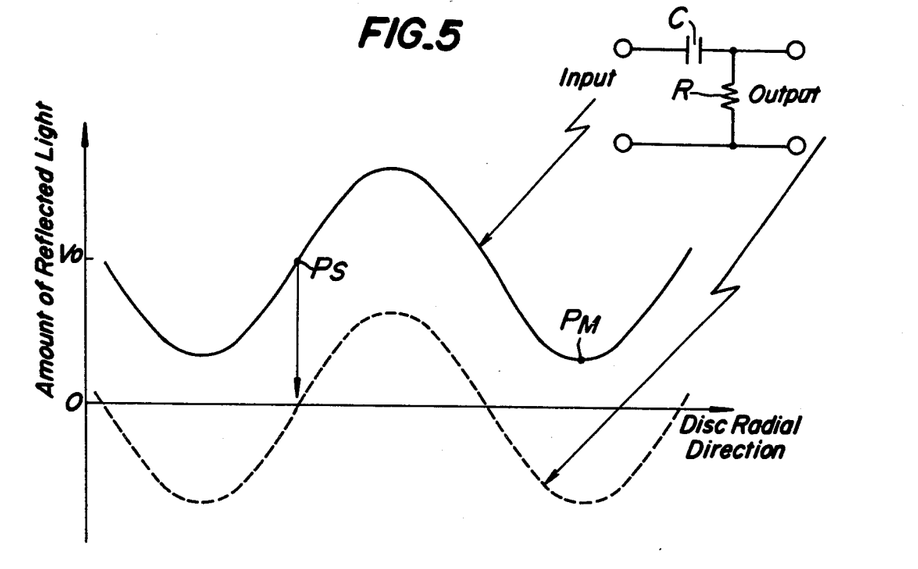

FIG. 4 is a diagram showing a positional relation between a main beam spot (illustrated by M) for recording impinging upon the recording surface of the disc by means of above mentioned optical system and a sub beam spot for tracking (illustrated by S), and a pit P previously recorded by the main beam. This pit is generated on the recording surface by the main beam which turns on and off according to the encoded video signal to be recoded and an information signal such as audio signals, data signals and so on, and also a center of the sub beam is arranged at an edge of adjacent track. The positional relation between the main and sub beams has been fixedly determined, so that if the center of the sub beam spot S traces correctly the edge of adjacent track, the spot M always moves along a correct path with a constant distance with respect to the adjacent track. FIGS. 4 and 5 are the diagrams explaining the above mentioned controlling method.

In FIG. 5, a solid line illustrates the relation between a location along a radius of the main and sub beams and amounts of the main and sub beams reflected by the recording surface, and $P_M$ and $P_S$ show the locations of the main and sub beams which are located at the center and edge of the pit, respectively.

Therefore, if the sub beam deviates from the edge of the pit in the radial direction of the disc, the light amount of the reflected sub beam increases or decreases extraordinarily about a light amount ($V_0$) which is obtained when the center of the sub beam is located at the pit edge. In this manner there is obtained a signal which is variable in both directions about $V_0$ from the light detector 11 according to a deviation of the spot S with respect to the pit edge.

Therefore, by comparing this signal with the standard value corresponding to $V_0$, a signal representing an amount and a direction of the deviation of the sub beam with respect to the edge of the pit, i.e. the edge of the recording track and a tracking error signal can be obtained. At this time, if the tracking control is performed, so that the reflected light intensity of the sub beam is always made equal to the value $V_0$ by moving the objective lens 5 in the radial direction of the disc as shown by X in FIG. 1, the center of the sub beam is located at the edge of the previously recorded track and the main beam is kept at a given position which is spaced by the constant distance from said recorded track. In FIG. 5, $P_M$ shows a position of the main beam.

However, if there is a variation in the light intensity of the light source 1 or a variation in the refractive index of the disc surface 7, a pure tracking error signal cannot be obtained, because the direct current component of the signal supplied from the light detector 11 corresponding to said standard value $V_0$ varies in accordance with said variation and thus, there occurs a problem that the tracking control could not be performed correctly.

According to the invention in order to solve this problem, the signal supplied from the light detector 11 is passed through a high pass filter consisting of CR circuit, for example, shown in the right-upper part of FIG. 5. After such a filtering process, since the variation of the direct current component in the signal supplied from the light detector 11 due to the variation of the refractive index of the disc surface, the variation of the intensity of the light source, etc. can be removed, the signal supplied from the detector 11 and shown by a solid line in FIG. 5 changes into a signal illustrated by a dotted line. When the sub beam is located at the desired position, that is, the edge of pit, the signal supplied from the filter becomes always zero. In this manner the accurate tracking error signal can be obtained without being influenced by the various interferences such as the light intensity deviation of the light source and the deviation of the refractive index of the disc surface.

In this case, a possible tracking error information in the low frequency regions including the direct current might be lost. This may cause a problem when the information is to be picked-up from the disc. In such a case, the main beam has to trace the center of tracks in a completely correct manner. However, in case of recording the information, the above mentioned loss of the low frequency component in the tracking error signal does not cause any trouble, but plays advantageous effect. That is to say, in case of playing back for instance, the track recorded spirally should be traced, so that the tracking might be out of the control when the direct current component of the tracking error signal is lost, unless mechanism for travelling the optical system in the radial direction has high accuracy and very small play. In case of recording, if the direct current component is accumulated, the recorded track might be deformed. According to the invention, since the direct current component is removed from the tracking error signal, the recorded track is hardly deformed and desired circular tracks can be formed.

Figure 6:
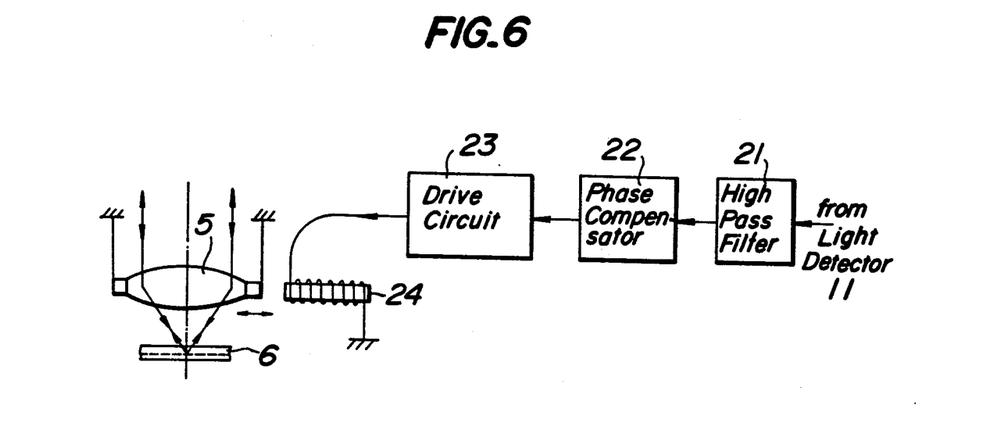
FIG. 6 is a schematic view showing one embodiment of a tracking control system in the recording apparatus according to the invention.

FIG. 6 is a schematic view showing one embodiment of the tracking control system mentioned above. In this embodiment, the output signal supplied from the light detector 11 is supplied to a high pass filter 21 which removes from the output signal the nearly direct current component due to the variations such as the light intensity variation of the light source and the variation of the refractive index of the disc reflection surface. Then this signal having the low frequency component removed therefrom is supplied to a driving circuit 23 through a phase compensation circuit 22. In this circuit, the signal is processed and amplified and then is supplied to a radial actuator 24 as a driving signal, and then the center of the sub beam is driven into the position at the edge of the pit by moving the objective lens 5 in the disc radial direction.

Figure 7A:
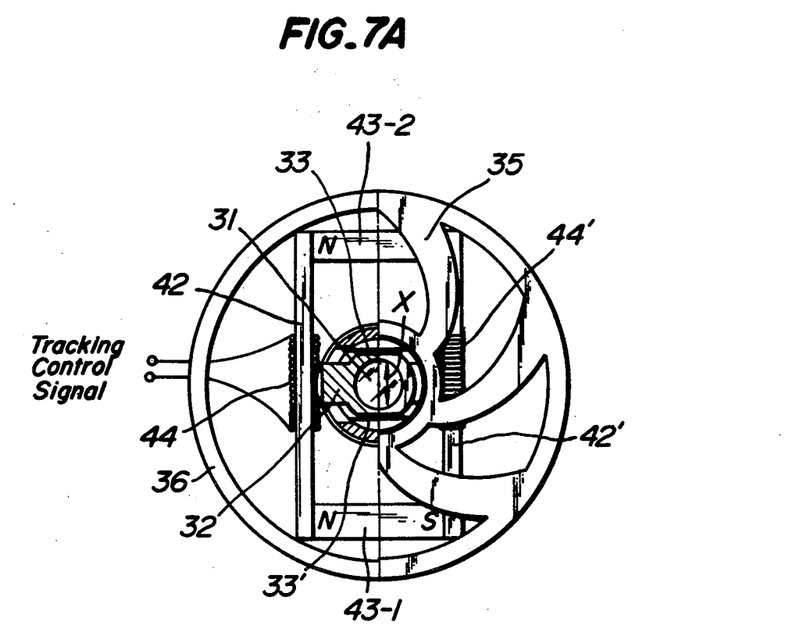
FIGS. 7A and 7B are a plan view and a cross sectional view, respectively, illustrating one embodiment of a radial actuator.
Figure 7B:
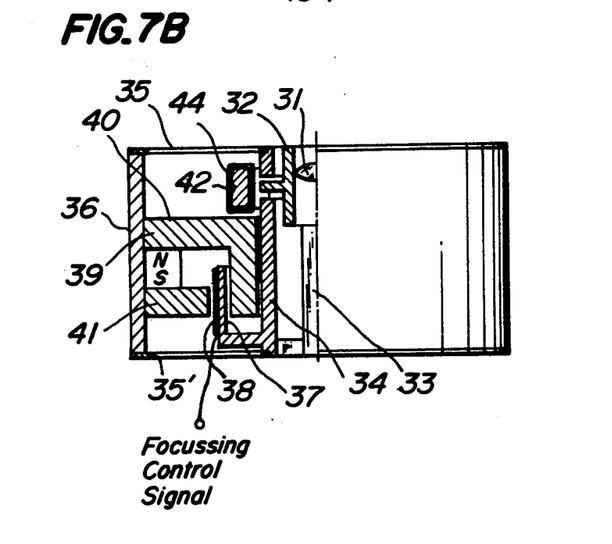

As for the radial actuator 24 it is preferable to use the one which has already proposed by the applicant and this type of the actuator is shown in FIG. 7. An objective lens 31 (corresponding to the objective lens 5 in FIG. 1) is fixed in a tubular lens holder 32 made of magnetic material which is supported by a pair of leaf springs 33 and 33', movably with respect to an intermediate cylindrical body 34 in the direction X perpendicular to the optical axis as well as to the information track. The apparatus further comprises an outer cylindrical body 36 arranged coaxially with the intermediate cylindrical body 34. These cylindrical bodies 34 and 36 have substantially same axial lengths and are coupled with each other at their upper and lower ends by means of a pair of generally disc-shaped leaf springs 35 and 35', respectively, in such a manner that the intermediate cylindrical body 34 and thus the lens 31 can move in the optical axis direction, i.e. focussing direction. In order to move the intermediate cylindrical frame 34 and thus the lens 31 in the focussing direction, a moving coil 38 is wound on a ring 37 formed integrally with the intermediate cylindrical frame 34 and a ring-shaped permanent magnet 39 and ring-shaped yokes 40 and 41 are arranged in a space between the intermediate and outer cylindrical bodies 34 and 36. In this manner, a focussing drive mechanism of a voice coil type is constructed. Therefore, a focal point of the objective lens is always located on the disc by supplying to the coil 38 an electric current corresponding to an amount and a direction of a defocus obtained by processing the focussing error signal supplied from the light detector 10.

On the contrary, in order to carry out the tracking control by deviating the objective lens 31 in the direction perpendicular to the information track and the optical axis, first and second fixed yokes 42 and 42' co-operating with projections of the cylindrical body 32 are secured to the outer cylindrical body 36. Permanent magnets 43-1 and 43-2 are coupled with these fixed yokes at both ends. Moreover, on the first and second yokes 42 and 42' are wound first and second coils 44 and 44' at their middle portions, respectively. In said tracking drive mechanism, a closed loop magnetic field which passes through the fixed yoke 42, the cylindrical body 32, and the fixed yoke 42' is performed by the permanent magnets 43-1 and 43-2 in a symmetric direction about the direction which passed through the optical axis of the objective lens 31 and is perpendicular to the direction X, and the coils which are opposed to the projections of the cylindrical body 36 are exposed in these magnetic fields. Therefore, when electric currents are supplied to the coils 44 and 44' in one direction, the cylindrical body 32, that is, the objective lens 31 is moved in one direction along the arrow X, and when reversed the direction of electric currents, the objective lens 31 is driven in the opposite direction. In the present embodiment the relation between an amplitude of the currents flowing through the coils 44 and 44' and an amount of the displacement of the objective lens 31 becomes linear. Therefore, the tracking control can be carried out in an accurate manner by supplying electric currents to the coils 44 and 44' by means of the driving circuit 23 (FIG. 6) corresponding to an amount and a polarity of the tracking error signal applied from the light detector 11 (FIG. 1). It should be noted that the recording spot may be deviated in the radial direction by means of a pivottable mirror instead of moving the objective lens.

Figure 8:
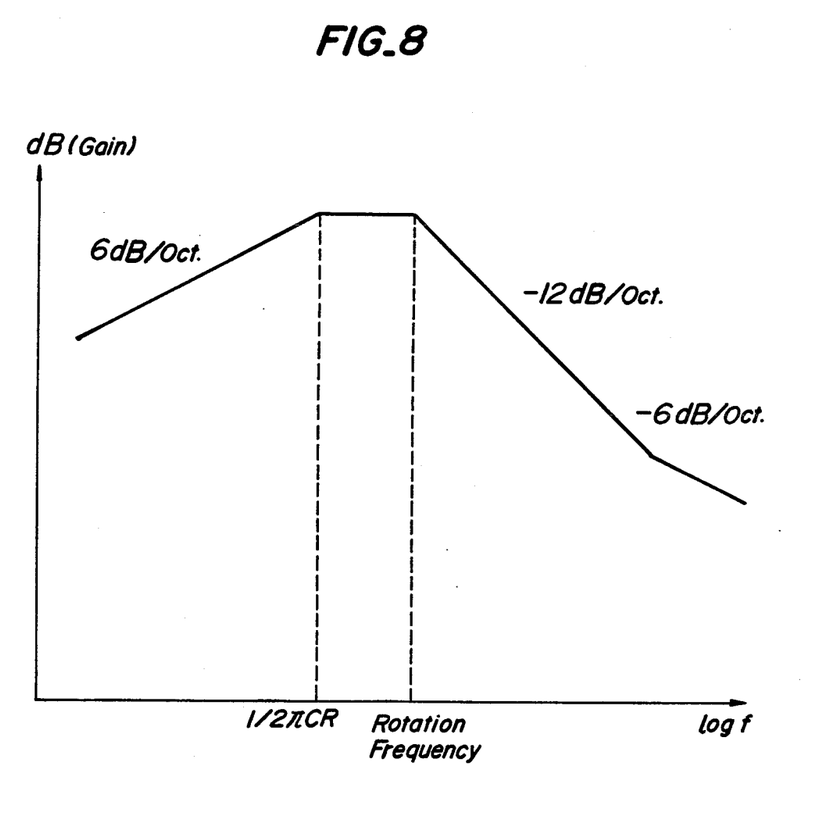
FIG. 8 is a diagram showing a frequency characteristic of the tracking control system illustrated in FIG. 6.

FIG. 8 is a diagram showing a frequency characteristic of the tracking control system illustrated in FIG. 6. As clearly shown in FIG. 8, a gain (sensitivity) of this tracking control system increases at 6 dB/Oct. till a frequency ($\frac{1}{2}\pi CR$) at which a frequency of the tracking error signal is defined by a CR constant of the high pass filter 21, becomes constant till a rotation frequency of the disc or a frequency larger than that, then decreases at $-12$ dB/Oct., and then decreases at $-6$ dB/Oct. from a certain frequency (which is decided by a characteristic of the radial actuator 24) by an action of the phase compensation circuit 22.

Apparent from this frequency characteristic, above mentioned tracking control system according to this invention has a very high sensitivity for the tracking error signal at a frequency near the disc rotation one, and has a low sensitivity to a frequency near the direct current component. Therefore, the control is so performed that a position of the sub beam for tracking is always located at the edge of the adjacent track which has been previously recorded, and a position of the main beam for recording is always maintained at the given distance from said adjacent track, so that an information signal can be recorded along desired circular track which is spaced from said previously recorded track by the given constant distance.

Figure 9:
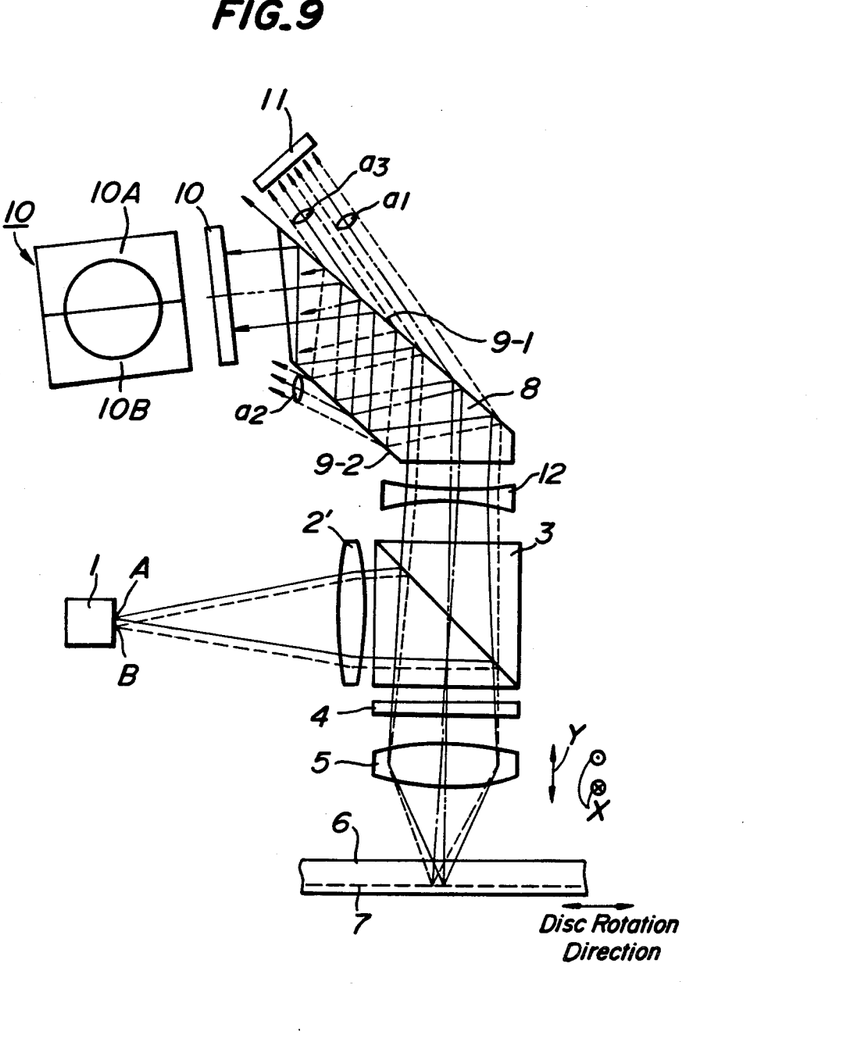
FIG. 9 is a schematic view showing a modified embodiment of the recording apparatus shown in FIG. 1.

FIG. 9 is a schematic view showing a modified embodiment of the recording apparatus illustrated in FIG. 1 and elements corresponding to those shown in FIG. 1 are denoted by the same reference numerals. In this embodiment, the main and sub beams which are reflected by the disc and are transmitted through the objective lens 5 are converging light fluxes. The converging light fluxes are converted into parallel light fluxes by a concave lens 12 arranged between the detection prism 8 and the polarizing prism 3. Then the parallel light fluxes impinge upon the detection prism 8. In this way, a cross section of the light fluxes incident upon the detection prism can be made small and thus, the detection prism can be made small in size, so that it is preferable especially when a refractive index of the detection prism is large. Moreover, if the cross section of the incident light flux upon the detection prism is made equal to that in FIG. 1, there is a merit that the cross section of the incident light flux upon the objective lens can be made larger than that in FIG. 1. According to the invention, the main and sub beams which are reflected by the disc and transmitted through the objective lens 5 may be diverging light fluxes. In this case the diverging light fluxes may be converted into parallel light fluxes by arranging a proper lens between the detection prism and the polarizing prism and the parallel light fluxes may be made incident upon the detection prism.

The invention is not limited to the above described embodiments, but various modifications and alternations are possible within the scope of the invention. For example, in the embodiments mentioned above the tracking control is performed by locating the center of sub beam at the edge of the previously recorded adjacent track, but in case that a microgroove for tracking has been already arranged on the disc surface, i.e. in case of using a pregrooving disc, the tracking control is, of course, performed by locating the sub beam at an edge of this pregroove. Moreover, in the embodiments mentioned above, the refractive index of the detection prism is assumed to be 1.50, but as long as an angle of a reflection prism is arranged nearly at a critical angle, a refractive index may be varied at will. Furthermore, in the embodiments mentioned above the polarized light is used, but the present invention may be advantageously applied to a non-polarized light. In the above embodiments the polarizing prism is used, but a half mirror may be used in a similar manner. Further, this invention may be applied to various recording apparatuses in which the tracking control is performed by using the sub beam and of course the tracking control can be carried out in an accurate manner.

What is claimed is:

1. A detection apparatus for detecting the correct positioning of a light beam which is modulated to transfer information into a record medium by utilizing an unmodulated light beam having a direction which is different than the direction of the modulated light beam, comprising means for projecting modulated and unmodulated light beams, means for focussing said light beams onto a record medium;

means for reflecting said light beams, said reflecting means comprising means defining a surface positioned at the critical angle of reflection for a modulated light ray passing through the optical axis of said focussing means;

first detecting means for receiving primarily modulated light initially reflected from a record medium and subsequently reflected by said reflecting means, said first detecting means being positioned such that a modulated light beam illuminating said surface means will at least in part subsequently illuminate said first detecting means;

second detecting means for receiving primarily unmodulated light, said second detecting means being positioned such that a substantial portion of the unmodulated light reflected from a record medium will illuminate said surface means and at least in part be received by said second detecting means;

means for positioning the modulated and unmodulated light beams;

circuit means for electrically connecting said second detecting means to said positioning means, said circuit means comprising filter means for removing the low frequency component from the electrical signal transmitted by said second detecting means prior to being received by said positioning means; whereby the influence of low frequency variations of the initial intensity of the unmodulated light beam before reflection and low frequency variations developed by changes in refractive index of a recording medium will not influence the signal received by said positioning means.

2. A method of optically illuminating a record medium having recorded tracks comprising:

projecting main and sub light beams onto a record medium in such a manner that the main and sub light beams are inclined with respect to one another and the sub light beam is focused on the edge of a recorded track and the record medium reflects both of said main and sub light beams;

positioning a reflecting surface at a critical angle with respect to said reflected main light beam but at an angle smaller than the critical angle with respect to said sub light beam such that said main light beam is substantially totally reflected by said reflecting surface and said sub light beam is substantially totally transmitted by said reflecting surface to separate said main and sub light beams from one another;

detecting the transmitted reflected sub light beam to produce a tracking error signal;

detecting the main light beam reflected from said reflecting surface to produce a focusing error signal;

removing a low frequency component including a direct current component from the tracking error signal to produce a corrected tracking error signal;

moving said main and sub light beams along an optical axis in response to said focusing error signal and moving said main and sub light beams in a direction perpendicular to a track in response to said corrected tracking error signal.

3. The method of claim 2 wherein said step of detecting the reflected main light beam from said reflecting surface comprises detecting said reflected light beam in two light receiving regions divided along a boundary plane which is perpendicular to an incident plane of said reflecting surface and detecting the difference in light received by said two light receiving regions to produce said focusing error signal.

4. The method of claim 2 wherein said reflected main and sub light beams are directed upon said reflecting surface a plurality of times.

5. An apparatus for optically illuminating a record medium having record tracks comprising:

means for providing a main modulated light beam and an unmodulated sub light beam;

means for projecting said main and sub light beams onto a record medium such that the sub light beam is positioned on the edge of a track and both said main and sub light beams are reflected from the record medium;

means for forming a reflecting surface positioned at a critical angle with respect to said reflected main light beam and at an angle smaller than the critical angle with respect to said reflected sub light beam to substantially totally reflect said reflected main light beam and substantially totally transmit said reflected sub light beam;

first detector means for receiving the reflected sub light beam transmitted by said reflecting surface for producing a tracking error signal;

means for high pass filtering the tracking error signal to remove low frequency components including a direct current component to produce a corrected tracking error signal;

means responsive to said corrected tracking error signal for producing a tracking control signal; and means responsive to said tracking control for moving said main and sub light beams relative to the record medium in a direction perpendicular to a track.

6. The apparatus of claim 5 wherein said means forming a reflecting surface comprises a detection prism having one surface forming said reflecting surface.

7. The apparatus of claim 5 wherein said detection prism is formed by an elongated rectangular prism having two reflection surfaces opposed to one another such that said reflected main and sub light beams are reflected by said reflection surfaces a plurality of times.

8. An apparatus for detecting the correct positioning of a light beam illuminating an object with respect to a predetermined position on said object comprising:

means for directing first and second light beams onto an object at different angles of inclination with respect to one another such that said first light beam illuminates the object and said second light beam illuminates the object at a predetermined position with respect to said first light beam and both said first and second light beams are reflected from the object;

means defining a surface positioned at a critical angle with respect to said reflected first and second light beams such that said reflected first light beam is substantially reflected by said surface and said reflected second light beam is substantially transmitted by said surface to separate said reflected first and second light beams from one another;

means for detecting a substantial portion of the reflected second light beam transmitted by said surface and providing an output signal;

means coupled to receive and filter said output signal for removing low frequency components to produce a filtered signal; and means responsive to said filtered signal for controlling the position of projection of said first and second light beams on the object with respect to the predetermined position.

9. The apparatus of claim 8 wherein said means for projecting comprises beam splitting means for receiving and projecting said first and second light beams upon said object and receiving and projecting said reflected first and second light beams upon said surface.

10. The apparatus of claim 8 further comprising second detector means for receiving a substantial portion of said reflected first light beam reflected from said surface, means for focusing said projected first and second light beams, and means responsive to said second detector means for controlling said means for focusing.

* * * * *